United States Patent [19]

Stone

[11] Patent Number: 4,815,701
[45] Date of Patent: Mar. 28, 1989

[54] SPRING AND SEAT ASSEMBLY FOR BALL VALVES

[75] Inventor: Ralph S. Stone, Houston, Tex.

[73] Assignee: Cooper Industries, Inc., Houston, Tex.

[21] Appl. No.: 187,806

[22] Filed: Apr. 29, 1988

[51] Int. Cl.[4] .............................................. F16K 5/20
[52] U.S. Cl. ..................................... 251/174; 251/315
[58] Field of Search ........................ 251/174, 180, 315

[56] References Cited

U.S. PATENT DOCUMENTS

| | | | |
|---|---|---|---|
| 3,154,094 | 10/1964 | Bredtscheider et al. | 251/315 X |
| 3,171,429 | 3/1965 | Sturmer et al. | 251/315 X |
| 3,563,265 | 2/1971 | Graham | 251/315 X |
| 4,342,330 | 8/1982 | Wieveg et al. | 251/315 X |

Primary Examiner—A. Michael Chambers
Assistant Examiner—John C. Fox
Attorney, Agent, or Firm—Eddie E. Scott; Alan R. Thiele; Nelson A. Blish

[57] ABSTRACT

A spring for a top entry ball valve includes a generally "u" shaped spring body with an open end. The ball valve includes a valve body with inlet and outlet flow passages communicating with a valve chamber. A ball element is mounted in the valve chamber for rotation between open and closed positions relative to the flow passages. A seal element is mounted adjacent each flow passage with a sealing face in opposed sealing relation to the ball element. A moveable seat assembly is located between the seal element and the valve body for maintaining the seal element in sealing relation to the ball element. The spring is located between the moveable seat assembly and the valve body and is adapted to urge the moveable seat assembly and the seal element toward the ball element.

3 Claims, 3 Drawing Sheets

SPRING AND SEAT ASSEMBLY FOR BALL VALVES

BACKGROUND OF THE INVENTION

1. Field of the Invention

The present invention relates in general to valves and more particularly to ball valves for controlling fluid flow. The present invention is particularly adapted for valves used in the oil and gas industry.

2. Background

A ball valve of the type used in the oil and gas industry includes a ball valve element with an internal flow passage. The internal flow passage is aligned with inlet and outlet passages in the "open" position and placed out of alignment with the inlet and outlet passages in the "closed" position. Sealing members contact the ball valve element to provide a fluid tight seal between the inlet/outlet passages and the ball valve element. A seat assembly system is provided for maintaining the sealing members in an energized condition. Heretofore, various types of spring and seat assemblies have been utilized to urge the sealing members into sealing engagement with the associated ball valve member. As shown in U.S. Pat. No. 4,266,566 to Gary W. Kacal and Charles C. Partridge dated May 12, 1981, continuous wave springs are illustrated urging a valve seat assembly and resilient sealing ring into sealing engagement with an associated ball valve member.

In U.S. Pat. No. 4,477,055 to Charles C. Partridge dated Oct. 16, 1984, a ball valve structure is shown having a valve seat assembly positioned in annular seat pockets located in a flow passage on opposed sides of a ball valve member. Each valve seat assembly is mounted for limited longitudinal movement toward and away from the adjacent ball valve member and spring means are placed within the seat pockets behind the valve seat assemblies to urge the assemblies toward and into intimate contact with the ball valve member. The valve seat assembly includes inner and outer annular concentric seat rings with a resilient sealing ring secured therebetween. The inner annular seat ring has a flared end which fits inside the outer seat ring and energizes or deforms the sealing ring held therebetween, thereby, securely retaining the sealing ring between the seat rings and preventing the introduction of line pressure behind the sealing ring to possibly extrude the sealing ring from its position within the seat rings.

In U.S. Pat. No. 4,175,577 to Gary W. Kacal and Charles C. Partridge dated Nov. 27, 1979, a means and method for in-line removal of seat rings in ball valves is shown. A ball valve structure has a removable upper cover plate to permit the ball to be removed from the valve body. A separate cam tool (after removal of the cover plate) is positioned within the bore of the ball which has been partially rotated from the full open position, and upon a return rotation of the ball with the cam tool therein to a full open position an adjacent spring urged seat ring is cammed away from the ball to a retracted position. A seat ring retainer is then actuated to hold the seat ring in the retracted position. The cam tool is then utilized in a similar manner to cam the other opposite seat ring in the retracted position. The ball may then be removed with the seat rings for replacement or repair as desired. The seat rings and seals thereon may be removed and replaced in such manner without removal of the valve from the flowline in which the valve is positioned.

DESCRIPTION OF THE PRESENT INVENTION

The present invention provides a spring that cooperates with a seat assembly in a ball valve to urge a seal ring into sealing engagement with an adjacent ball valve member. The present invention is particularly adapted to a top entry ball valve in which the seal ring is normally urged into engagement with the ball element and which may be replaced upon removal of the top plate of the valve.

In the present invention, the spring and seat assembly are positioned between the ball valve element and an opposed surface on the valve body. The seat assembly is moveable and carries the seal element. The spring is inserted between the moveable seat assembly and a surface on the valve body. The spring is of a generally horseshoe shaped configuration with an open end. When the spring is moved into its operative position, it causes the spring to be in a biasing relation to the seat assembly, the seal ring, the ball valve element and the valve body surface. The spring is easily replaced in so-called top entry ball valves. The upper cover plate is removed. The spring is removed. The old seal is removed and a new seal installed.

The seal ring can be removed and replaced while the valve is in place in a flowline. The spring is easily reinstalled once the new seal ring is located in position.

DETAILED DESCRIPTION OF THE INVENTION

Figure 1:
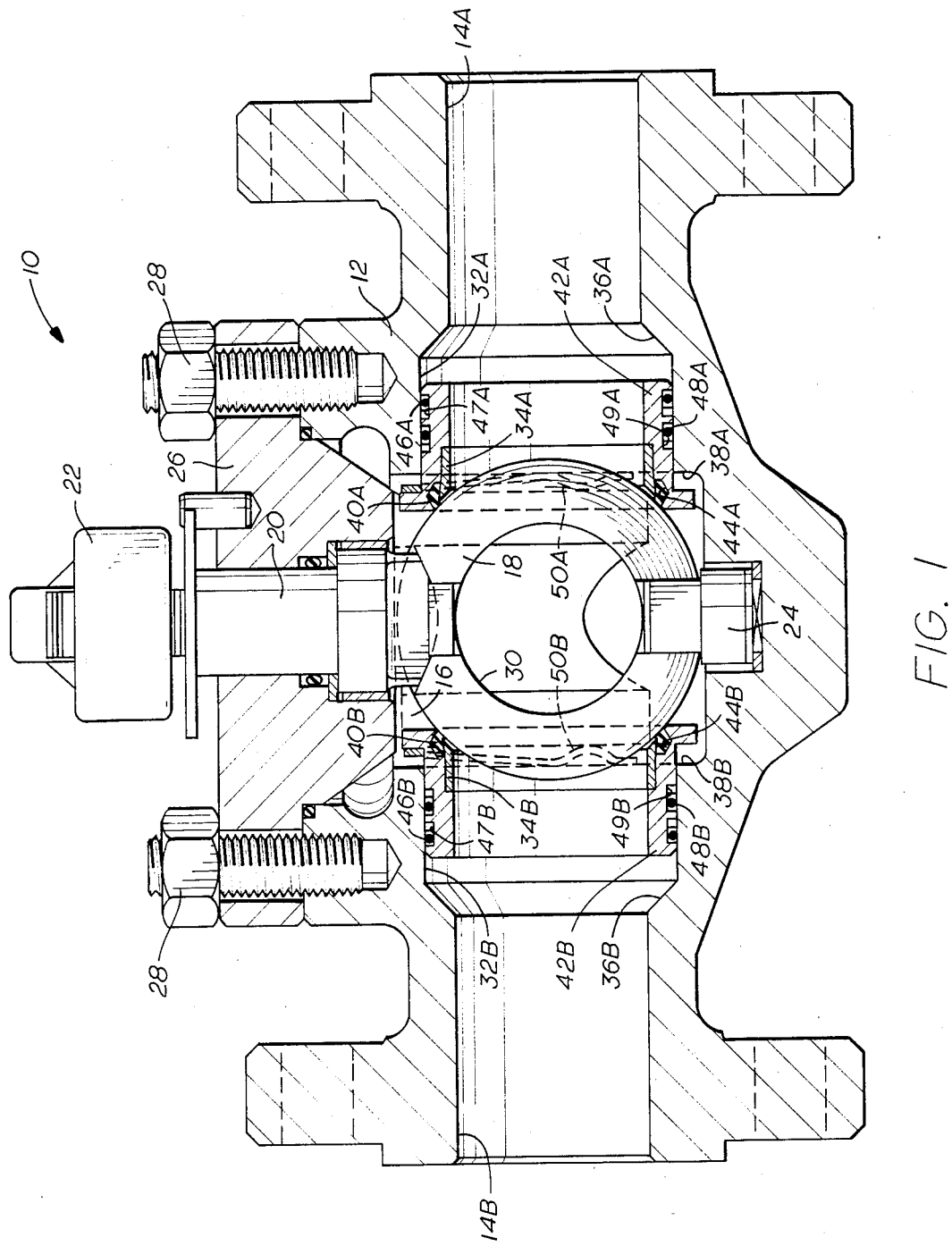
FIG. 1 is a sectional view of a ball valve of the top entry type having moveable seat assemblies. The valve is shown in the closed position.
Figure 2:
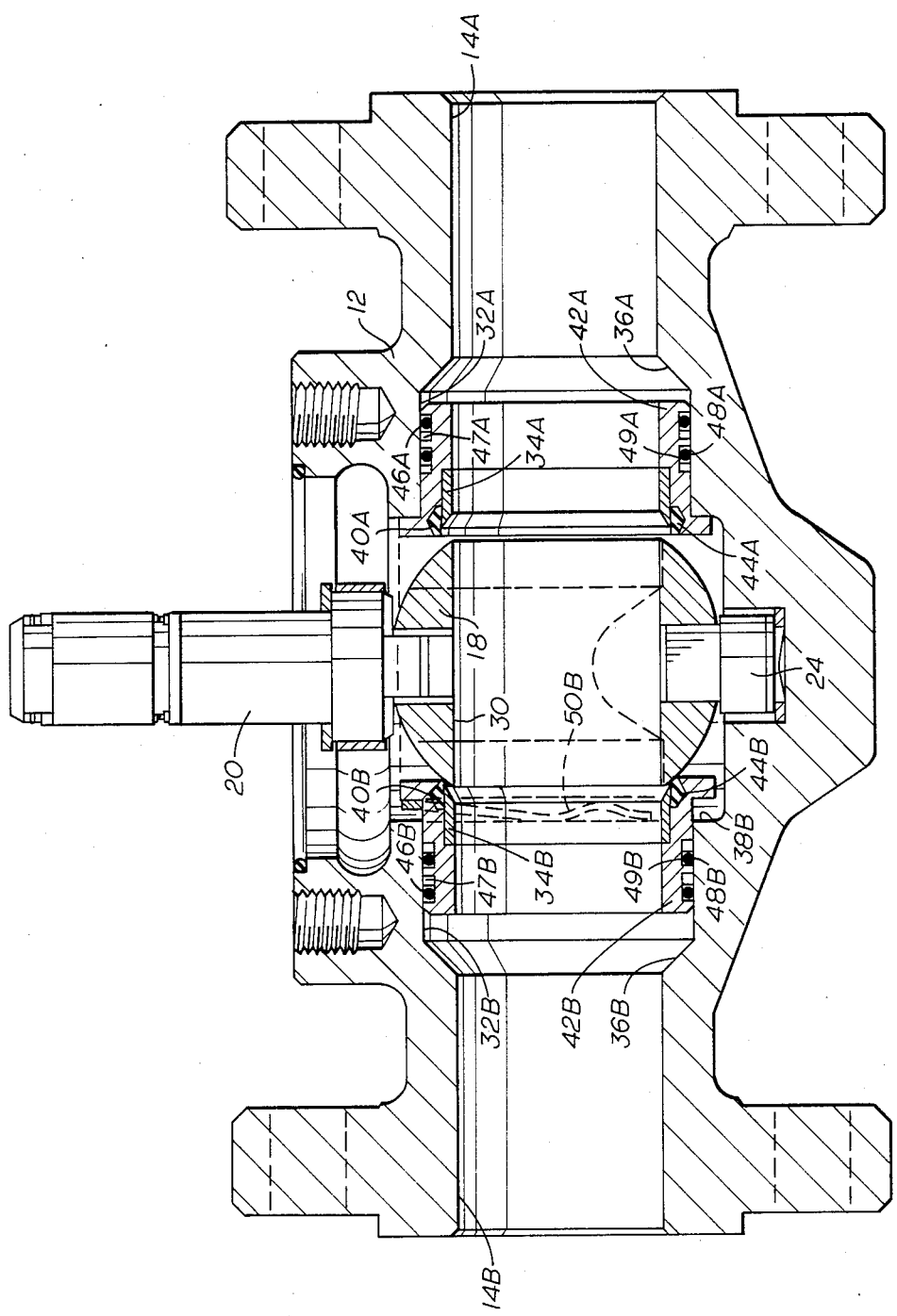
FIG. 2 is a sectional view of the ball valve of the top entry type shown in FIG. 1. The valve is shown in the open position.

Referring now to the drawings and to FIGS. 1 and 2 in particular, a top entry ball valve is shown and generally designated by the reference numeral 10. The valve 10 includes a valve body 12 having flow passages 14A and 14B. A valve chamber 16 is located between flow passages 14A and 14B. A ball valve element 18 is mounted in the valve chamber for movement between the closed position shown in FIG. 1 and the open position shown in FIG. 2. A stem 20 secured to ball valve element 18 has a handle 22 which may be gripped for moving ball valve element 18 between the open and closed positions relative to flow passages 14A and 14B. A lower trunnion 24 is mounted on the lower portion of ball valve element 18. An upper cover plate 26 is removably connected to valve body 12 by studs 28. Ball valve element 18 includes a flow passage 30 therethrough which is adapted to be aligned with flow passages 14A and 14B when the ball valve element 18 is moved to the open position shown in FIG. 2.

Located at the juncture of the flow passages 14A and 14B and the valve chamber 16 are a pair of enlarged bore portions. The enlarged bore portions comprise straight bore sections 32A and 32B. The surface between the straight bore sections 32A and 32B and flow passages 14A and 14B define tapered shoulders or abutments 36A and 36B.

The surfaces between valve chamber 16 and straight bores 32A and 32B define shoulders or abutment surfaces 38A and 38B which face valve chamber 16. A pair of seal rings 40A and 40B are mounted in sealing engagement with the ball element 18 to provide a fluid tight seal and also allow movement of the ball element 18.

Moveable seat assemblies are located within valve chamber 16 and straight bore sections 34A and 34B for floating longitudinal movement relative to ball valve element 18. The seat assemblies comprise seat outer rings 42A and 42B and seat inner rings 34A and 34B. Seal rings 40A and 40B are located within seal retaining grooves 44A and 44B on the inner surface of seat outer rings 42A and 42B. The seal rings 40A and 40B are maintained in sealing engagement with the ball valve member 18 by the seat inner rings 34A and 34B. Primary seal rings 46A and 46B are mounted in the grooves 47A and 47B in the outer circumferential surface of seat outer rings 42A and 42B. Graphite filament rope secondary seal rings 48A and 48B are located within grooves 49A and 49B.

The seat outer rings 42A and 42B have a cylindrical body and projecting annular flanges extending outwardly from the cylindrical body. Mounted between the annular flanges of seat outer rings 42A and 42B and the surfaces 38A and 38B on the valve body are spring elements generally indicated by the numerals 50A and 50B. The spring elements 50A and 50B are located in the annular space formed between the flanges on seat outer rings 42A and 42B and opposed surfaces 38A and 38B which face valve chamber 16. Engaging portions on the springs 50A and 50B maintain the springs in a biasing relation to the seat outer rings 42A and 42B, seat inner rings 34A and 34B, the seal rings 40A and 40B, the ball valve element 18 and the valve body 12.

The seat outer rings 42A and 42B have a pair of grooves 47A and 47B and 49A and 49B. Mounted within the grooves 47A and 47B are o-rings 46A and 46B which provide the primary fluid seal. Graphite filament seal rings 48A and 48B are mounted within the grooves 49A and 49B. The graphite filament seal rings 48A and 48B are formed by double wrapping graphite filament rope sections around the seat outer rings 42A and 42B with their ends spliced. The graphite filament seal rings provide a secondary seal and allow the valve 10 to safely operate in high temperature operations. Should the o-rings 46A and 46B be destroyed by heat, the graphite seal rings 48A and 48B will provide the necessary sealing function.

The springs 50A and 50B are readily replaceable in so-called top entry ball valves. The upper cover plate 26 is removed. The seal rings 40A and 40B can be removed from the valve body and replaced while the valve is in place in a flowline. The springs 50A and 50B are reinstalled once new seal rings are located in position.

Figure 5:
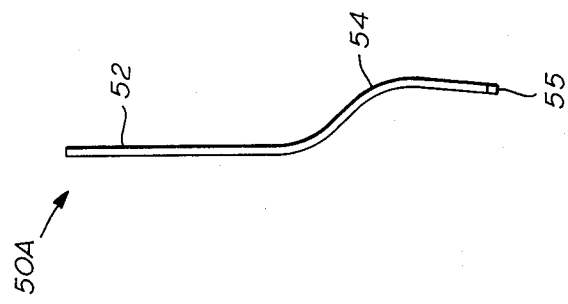
FIG. 5 is a side view of the spring shown in FIGS. 3 and 4.
Figure 4:
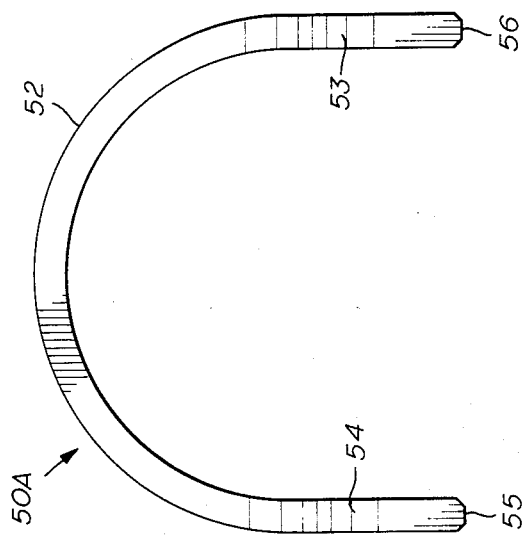
FIG. 4 is a front view of the spring shown in FIG. 3.
Figure 3:
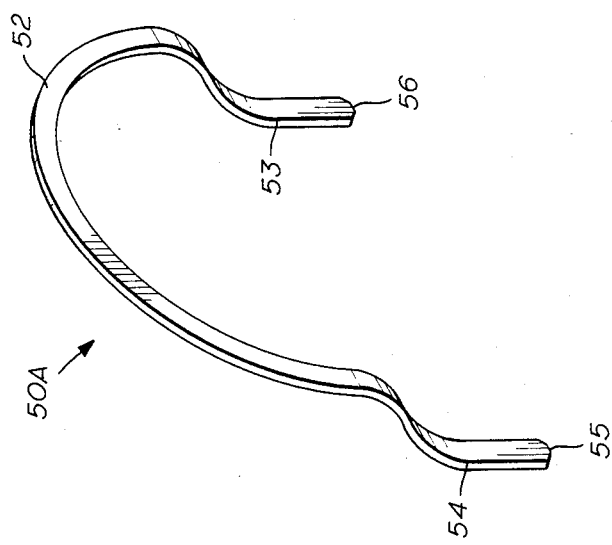
FIG. 3 is a pictorial view of a spring shown removed from the valve illustrated in FIGS. 1 and 2.

Referring to FIGS. 3, 4 and 5, one of the springs 50A is shown removed from the valve 10. The spring 50A is of a generally horseshoe shaped configuration with an open end. The spring includes a body section 52 and extending leg sections 55 and 56. The body portion 52 has a section that lies in a first plane. Engaging portions 53 and 54 located on the leg sections 55 and 56 are located outside of the plane of the body section.

Referring to FIGS. 1 through 5, the removal of worn seal rings and replacement with new seal rings will be described. The springs 50A and 50B of the configuration shown in FIGS. 3-5 can easily be removed from the valve. The cover plate 26 is removed. A screwdriver is used to pry the springs 50A and 50B away from the flanges on seat outer rings 42A and 42B. The spring 50A and 50B are removed. When the springs 50A and 50B have been removed, the seat assemblies 42A and 42B are moved outward. The seal rings 40A and 40B are removed and can be replaced with new seals. The moveable seat assembly 42A is shown positioned adjacent the surface 38A in FIG. 2. New seal rings are inserted in place and in the springs 50A and 50B are replaced thereby moving the moveable seat assembly 42A and the new seal rings back into place.

The embodiments of the invention in which an exclusive property or privilege is claimed are defined as follows:

1. In a ball valve having a valve body with inlet and outlet flow passages communicating with a valve chamber, a ball element mounted in said valve chamber for rotation between open and closed positions relative to the flow passages, a seal element mounted adjacent each flow passage with a sealing face in opposed sealing relation to the ball element, the improvement comprising:

a movable seat assembly located between said seal element and said valve body for maintaining said seal element in sealing relation to said ball element; and a spring positioned between said moveable seat assembly and said valve body adapted to urge said moveable seat assembly and said seal element toward the ball element, said spring having a generally horseshoe shaped body with a pair of extended legs.

2. A top entry ball valve, comprising:

a valve body having an inlet flow passage, an outlet flow passage and a valve chamber, a ball valve element mounted in said valve chamber for rotation between open and closed positions relative to the flow passages, an upper cover plate removably secured to the valve body and permitting removal of the ball from the valve body when the cover plate is removed, a seal element mounted adjacent each flow passage, said seal element having an annular sealing face in opposed spaced relation to the ball valve element;

a moveable seat ring assembly having an annular projecting flange projecting from a cylindrical body wherein said moveable seat ring assembly includes a pair of external annular grooves with an o-ring located in one groove and a heat resistant seal located in the other groove; and a spring positioned between said annular projecting flange and said valve body adapted to urge said moveable seat ring assembly and said seal element toward the ball valve element, said spring including a generally horseshoe shaped member with an open end.

3. A top entry ball valve, comprising:

a valve body, said valve body having a first flow passage, a second flow passage and a valve chamber;

a ball valve element mounted in said valve chamber for rotation between open and closed positions relative to the first and second flow passages;

an upper cover plate removably secured to the valve body permitting removal of the ball valve element from the valve body when the cover plate is removed;

a seal ring mounted adjacent said first flow passage having an annular face in opposed sealing relation to the ball valve element;

a moveable seat assembly located between seal ring and said valve body for maintaining said seal ring in sealing relation with said ball valve element, and a spring positioned between said moveable seat assembly and said valve body adapted to urge said moveable seat assembly and said seat ring toward the ball valve element, said spring having a generally horseshoe shaped body with a pair of extended legs.

* * * * *